United States Patent [19]

Shoupp et al.

[11] 3,860,809

[45] Jan. 14, 1975

[54] PHOTOFLASH LAMP-REFLECTOR MODULE AND MINIATURE MULTIFLASH UNITS FOR PHOTOGRAPHIC CAMERAS

[75] Inventors: William E. Shoupp, Edgewood; Walter V. Bratkowski, McKeesport; John N. Esposito, Penn Hills, all of,, Pa.

[73] Assignee: Westinghouse Electric Corporation, Pittsburgh, Pa.

[22] Filed: July 17, 1973

[21] Appl. No.: 380,181

[52] U.S. Cl. ........................... 240/1.3, 240/103 R
[51] Int. Cl. ........................................ G03b 15/02
[58] Field of Search .......... 240/1.3, 103 R; 95/11 L; 431/93, 95; 354/126, 143

[56] References Cited
UNITED STATES PATENTS

| | | | |
|---|---|---|---|
| 3,096,025 | 7/1963 | Prochnow | 240/1.3 |
| 3,263,457 | 8/1966 | Reiber | 431/95 |
| 3,309,513 | 3/1967 | Aymar | 240/1.3 |
| 3,597,602 | 8/1971 | Divoky et al. | 240/1.3 |
| 3,598,984 | 8/1971 | Slomski | 240/1.3 |
| 3,609,331 | 9/1971 | Fink et al. | 240/1.3 |
| 3,609,332 | 9/1971 | Schindler | 240/1.3 |
| 3,619,590 | 11/1971 | Meulemans et al. | 240/1.3 |
| 3,675,004 | 7/1972 | Gulbrasen et al. | 240/1.3 |

*Primary Examiner*—Fred L. Braun
*Attorney, Agent, or Firm*—D. S. Buleza

[57] ABSTRACT

A tubular photoflash lamp that has a volume less than 0.6 cc and contains hafnium fuel is combined with a reflector that has a maximum width opening which is from about 1.2 to 2 times the lamp diameter to provide a miniaturized lamp-reflector module that has a light output that substantially matches or exceeds that obtained from the larger lamp-reflector modules used in conventional flashcubes (475 zonal lumen-seconds). Selected numbers of the novel lamp-reflector modules are grouped together in various geometrical arrays to provide miniature flashcubes and miniature rectangular or cylindrical-shaped multiflash units having dimensions that conform more closely with those of the compact automatic cameras now being marketed.

20 Claims, 41 Drawing Figures

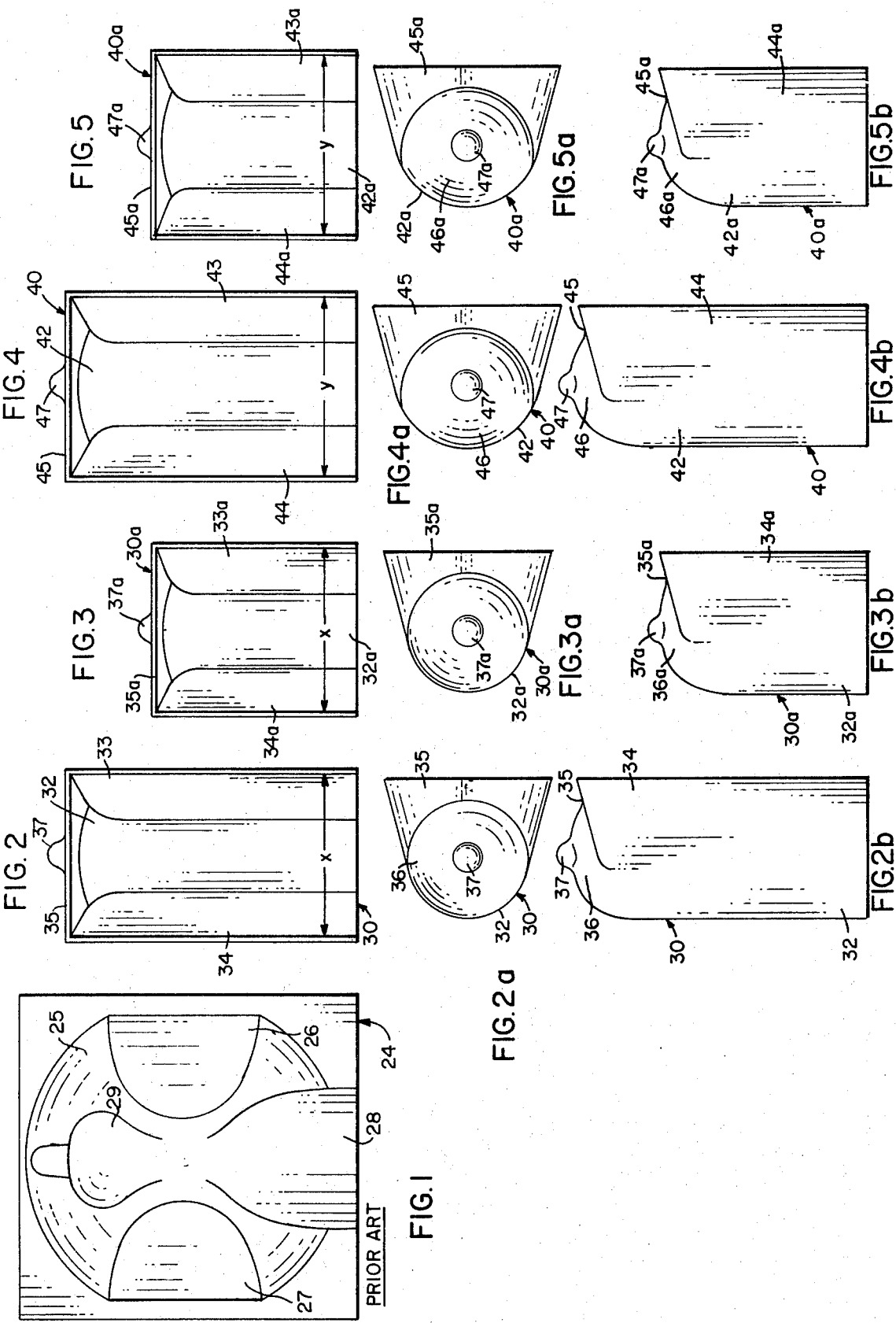

PHOTOFLASH LAMP-REFLECTOR MODULE AND MINIATURE MULTIFLASH UNITS FOR PHOTOGRAPHIC CAMERAS

CROSS-REFERENCES TO RELATED APPLICATIONS

The subject matter of this application is related to that disclosed and claimed in application Ser. No. 380,179 and application Ser. No. 380,180 of W. E. Shoupp and W. V. Bratkowski, which applications are filed concurrently herewith and are assigned to the same assignee as the present application. The subject matter of both of the aforesaid concurrently-filed applications is hereby incorporated by reference.

BACKGROUND OF THE INVENTION

1. Field of the Invention

This invention generally relates to the photoflash lamp art and has particular reference to a miniaturized lamp-reflector module and various types of compact multiflash units that contain a plurality of such lamp-reflector modules.

2. Description of the Prior Art

Multiflash units designed for use with photographic cameras are well known in the art. For example, rotatable flashcubes which contain four photoflash-reflector assemblies disposed within a plastic housing amd are inserted into sockets on compact automatic cameras are disclosed in U.S. Pat. No. 3,244,087 issued Apr. 5, 1966 to L. F. Anderson et al. Such flashcubes employ AG ½ type photoflash lamps and a reflector that is approximately 1 inch (25.4 mm.) square. The lamps contain zirconium fuel that is ignited by a primer-coated tungsten filament sealed within the lamp envelope.

More recently, non-rotatable multiflash units consisting of ten lamp-reflector modules disposed in back-to-back planar array to provide a "FlashBar" multilamp unit for use with instant-photographic cameras have been developed and marketed by the General Electric Company. Such lamp-reflector modules and multiflash units are described in U.S. Pat. Nos. 3,598,984; 3,598,985 and 3,609,332.

A photoflash lamp which employs shredded hafnium as a fuel is disclosed and claimed in U.S. Pat. No. 3,675,004 issued July 4, 1972 to E. A. Gulbransen et al. and flashlamps having dimensions smaller than those of AG ½ type photoflash lamps are disclosed in U.S. Pat. No. 3,506,385 issued Apr. 14, 1970 to K. H. Weber et al.

While the prior art multiflash units were satisfactory in that they provided the convenience of mounting a disposable unit on the camera and taking a series of flash pictures in quick succession, they are limited to 4 or 10 flashes per unit and are of rather large physical size. This latter deficiency is epitomized by the "Instamatic" pocket-size cameras introduced by the Eastman Kodak Company which employ "Magicubes" that are inserted into a socket on top of the camera and are slightly larger in size than conventional flashcubes. The loaded flashcube looks grotesquely oversized in comparison to the trim thin lines of such cameras.

It would accordingly be advantageous to have multiflash units that are more compact and physically compatible with the cameras presently being marketed but still provide a flash of light which is substantially equivalent to or exceeds that produced by a conventional flashcube as regards both intensity and color temperature.

SUMMARY OF THE INVENTION

The aforementioned objectives and other advantages are achieved in accordance with the present invention by providing a photoflash lamp having a tubular envelop that has a volume less than 0.6 cubic centimeters and contains hafnium fuel and then combining the lamp with a reflector whose dimensions are only slightly larger than those of the lamp envelope. The reflector has a maximum width opening that is only slightly larger than the lamp diameter and the back and sides of the reflector are so shaped and dimensioned that the lamp nests deeply within the reflector, thus providing a very compact lamp-reflector module. The hafnium fuel and oxygen fill of the lamp are so correlated that each of the lamp-reflector modules provide a light output of at least 460 zonal lumen-seconds despite their very small size.

Four of the improved lamp-reflector modules are combined to provide a miniature flashcube having dimensions that are more compatible, from both a functional and aesthetic standpoint, with those of "Instamatic" pocket type cameras. Miniaturized 10-lamp multiflash units of planar configuration and 12-lamp units of annular or cylindrical configuration suited for use with instant-photographic and similar kinds of cameras are also provided by the invention.

BRIEF DESCRIPTION OF THE DRAWINGS

A better understanding of the invention will be obtained by referring to the exemplary embodiments shown in the accompanying drawings, wherein:

FIG. 1 is an elevational view of a reflector component used in a conventional flashcube;

FIGS. 2, 2a and 2b are front elevational, plan and side elevational views, respectively, of an improved reflector component in accordance with the present invention;

FIGS. 3 and 3a–b, FIGS. 4 and 4a–b, and FIGS. 5 and 5a–b are similar views of three alternative reflector embodiments;

FIG. 21b is a fragmentary sectional view through one of the lamp-reflector modules of the multiflash unit shown in FIGS. 21 and 21a, taken along lines XXIb—XXIb of FIG. 21a;

FIG. 21c is a plan view of the bottom of the 12-lamp flash unit shown in FIGS. 21 and 21a.

DESCRIPTION OF THE PREFERRED EMBODIMENTS

Figure 6:
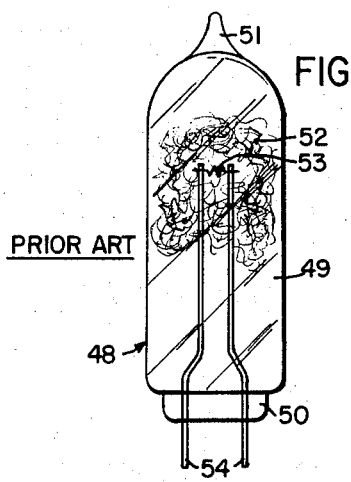
FIG. 6 is an elevational view of an AG ½ type photoflash lamp used in conventional flashcubes.

The improved reflectors of the present invention are much smaller and have a simpler contour than the reflector elements used in conventional flashcubes. As shown in FIG. 1, a flashcube reflector element 24 is generally of square-shape configuration and has a parabolic surface 25 that is interrupted by two laterally extending flats 26 and 27 and two vertically disposed arcuate cavities 28 and 29 that are contoured to accommodate the envelope of an inserted photoflash lamp.

In contrast, a reflector 30 according to one embodiment of the invention (shown in FIG. 2) is much shorter and narrower and generally consists of a rounded rear segment 32 that merges with two flat outwardly diverging side wall segments 33 and 34 that are joined by a top wall 35 that has a protruding nipple 37. The divergent side wall segments 33 and 34 are substantially flat and define an opening approximately 12.7 mm. wide (dimension "x"). As will be noted in FIGS. 2a and 2b, the nipple 37 extends from a dome-shaped portion 36 which merges with and rises upwardly from the top wall 35.

A more compact version of the above-described reflector is shown in FIGS. 3, 3a and 3b. The reflector 30a according to this embodiment is of exactly the same construction as reflector 30 except that it is shorter. Thus, reflector 30a has the same arcuate rear wall 32a, flat divergent side walls 33a and 34a, top wall 35a dome portion 36a with a protruding nipple 37a, and a front opening (dimension "x").

A slightly modified reflector 40 is shown in FIGS. 4, 4a and 4b. This reflector embodiment is identical to reflector 30 except that it has a wider front opening (dimension "y") and an arcuate rear wall 42 that has a slightly larger radius of curvature. Reflector 40 thus also has flat divergent side walls 43 and 44, a top wall 45 and a merging dome portion 46 with a protruding nipple 47. Reflector 40 has an opening (dimension "y") approximately 13.3 mm. wide.

A shortened version of reflector 40 is shown in FIGS. 5, 5a and 5b and comprises a reflector 40a having the above-described combination of an arcuate rear wall 42a, flat side walls 43a and 44a, top wall 45a, a dome portion 46a and protruding nipple 47a.

The AG ½ type photoflash lamp 48 employed in conventional flashcubes is shown in FIG. 6 and generally consists of a tubular glass envelope 49 having a press seal 50 at one end and a protruding seal tip 51 at its opposite end. The lamp 48 contains a measured quantity of shredded zirconium foil 52 and an oxygen atmosphere which are ignited by the usual primer-coated filament 53 that is connected to a pair of lead wires 54 sealed through the press seal 50. Such lamps have an overall length of approximately 25 millimeters and have a tubular envelope 9 millimeters in diameter which has a volume of 0.63 cubic centimeters. Lamps of this type are generally filled with 20 milligrams of shredded zirconium foil and around 8 atmospheres of oxygen and, when used with reflector 24 in a conventional flashcube, have a zonal light output of around 475 lumen-seconds.

Figure 7:
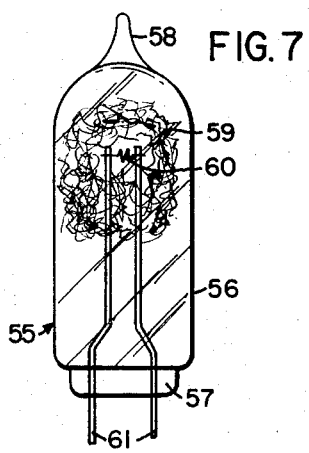
FIGS. 7 and 8 are similar views of two miniature photoflash lamp embodiments according to the invention.

One form of miniaturized photoflash lamp employed in combination with the aforesaid miniaturized reflector components is shown in FIG. 7. As will be noted, the miniaturized lamp 55 has a tubular envelope 56 that is hermetically closed by a press seal 57 and a seal tip 58. In contrast to the AG ½ lamp 48 shown in FIG. 6, lamp 55 contains a measured quantity 59 of shredded hafnium foil and an atmosphere of oxygen that are ignited by a primer-coated filament 60 connected to a pair of lead wires 61 embedded in the seal 57. While lamp 55 employs a tubular envelope 56 of the same diameter or width dimension (9 millimeters) as that used in conventional AG ½ photoflash lamp 48, it has an overall length of approximately 22.5 millimeters and a volume of about 0.55 cc.

Figure 8:
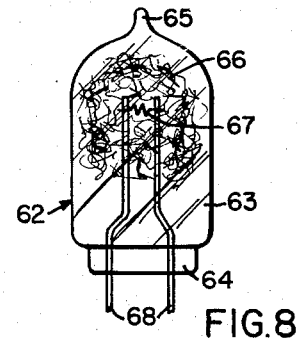

A smaller photoflash lamp 62 is shown in FIG. 8. It has a tubular envelop 63 that is closed by a press seal 64 and a seal tip 65 and contains a charge 66 of shredded hafnium fuel and an oxygen atmosphere that are ignited by a primer-coated filament 67 which is energized by a pair of lead wires 68 embedded in the seal 64. Lamp 62 is 9 millimeters in diameter, has an overall length of only 16 millimeters, and has a volume of about 0.46 cc.

While it is not shown in the drawing, each of the photoflash lamps described above are provided with acetate) in protective coating of clear plastic (such as cellulose acetate)in accordance with standard lamp-making practice to prevent the envelopes from rupturing when the lamps are fired.

Figure 9:
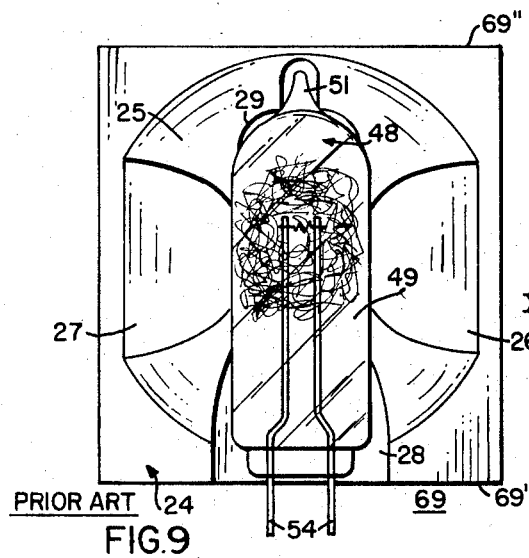
FIG. 9 is a front elevational view of the AG ½ lamp-reflector module employed in conventional flashcubes.

The various photoflash lamp-reflector modules formed by combining the respective lamps with the various reflector components are shown in FIGS. 9–13. The lamp-reflector module 69 employed in a conventional flashcube is shown in FIG. 9. As will be noted, when the AG ½ photoflash lamp 48 is placed into the flashcube reflector 24 the tubular portion of the lamp envelope 49 nests within the arcuate depressions 28 and 29 in the reflector and the bulb tip 51 is located within a channel that merges with depression 29. The overall length of this conventional lamp-reflector module 69 is about 25.4 millimeters (measured from bottom 69' to top 69'' of reflector as indicated).

In contrast, when photoflash lamp 55 is positioned in operative relationship with reflector 30 a miniaturized lamp-reflector module 70 (shown in FIG. 10) is provided which has an overall length of approximately 23.5 millimeters. Lamp-reflector module 70 is thus about 2 millimeters shorter (dimension "m" in FIG. 10 as measured from reference line 69'') than the lamp-reflector unit 69 employed in conventional flashcubes. As will be noted in FIG. 10a, the lamp envelope 56 and the arcuate portion 32 of the reflector 30 both have about the same radius of curvature. The lamp 55 thus nests deeply within the reflector 30 and the divergent flat side wall segments 33 and 34 extend a short distance beyond the lamp 55. The bulb tip 58 (see FIG. 10) is located within nipple 37 which protrudes from the top wall 35, thus holding the top of the lamp 55 in position within the reflector 30. The lead wires 61 protrude through the open end of the reflector 30 and the reflector opening is just slightly wider than the envelope diameter (12.7 mm. versus 9 mm.). The reflector opening in this case is thus about 1.4 times the lamp diameter.

Figure 11:
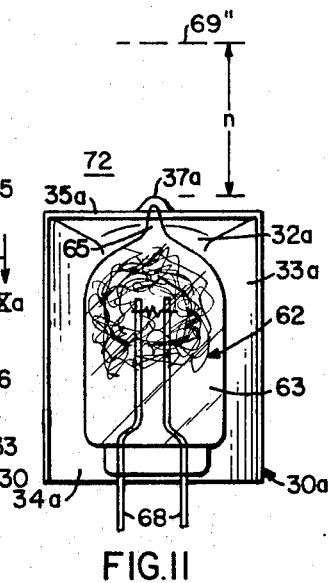
FIG. 11 is a front elevational view of a shorter lamp-reflector module embodiment that has a reflector with the same width opening and basic shape as the reflector shown in FIG. 10.

A greater reduction in the size of the lamp-reflector module is achieved when photoflash lamp 62 is combined with a shortened reflector 30a of the type shown in FIGS. 3, 3a and 3b. The resulting module 72 is shown in FIG. 11. The lamp 62 is again so located that the bulb tip 65 is positioned within the nipple 37a of the reflector 30a and the lead wires 68 protrude through the open end of the reflector. The overall length of module 72 is about 17 millimeters and is thus approximately 8.4 millimeters shorter (dimension "n" in FIG. 11 as again measured from reference line 69'') than the lamp-reflector module 69 employed in conventional flashcubes.

Figure 12A:
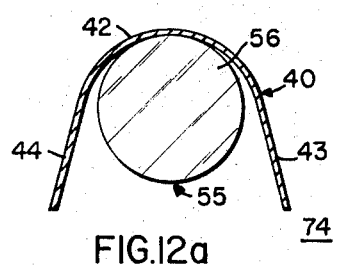
FIG. 12a is a cross-sectional view of the lamp-reflector module taken along line XIIa—XIIa of FIG. 12.
Figure 12:
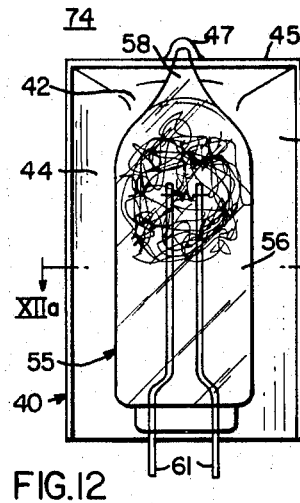
FIG. 12 is a front elevational view of another lamp-reflector embodiment having a reflector with a slightly wider opening.
Figure 13:
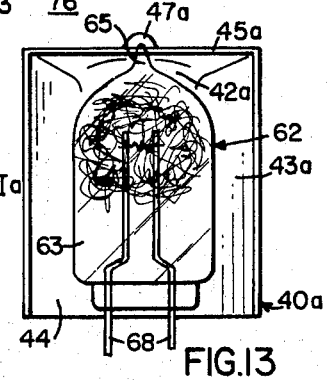
FIG. 13 is a front elevational view of a shorter reflector-lamp module having a reflector opening of the same size as that of the reflector shown in FIG. 12.

Alternative miniaturized lamp-reflector modules 74 and 76 which provide the same reduction in overall length as that achieved with modules 70 and 72, respectively, are shown in FIGS. 12 and 13. Lamp-reflector module 74 is formed by placing lamp 55 in a reflector 40 of the type shown in FIGS. 4, 4a and 4b and seating it therein so that the envelope 56 nestingly seats within the arcuate portion 42 of the reflector. As shown in FIG. 12a, since reflector 40 has a slightly wider opening than reflector 30, arcuate portion 42 has a radius of curvature that is slightly larger than that of the lamp envelope 56. The nesting relationship between the lamp 55 and the arcuate portion 42 of the reflector is thus not as intimate or "tight" as in the previously described lamp-reflector modules 70 and 72. The flat side wall segments 43 and 44 of the reflector are thus spaced a greater distance laterally from the lamp envelope 56. The reflector opening (dimension "y" in FIG. 5) was about 1.5 times the lamp diameter (13.3 mm. versus 9 mm.).

In accordance with this invention, the reflector opening can vary from about 1.2 to 2 times the diameter of the tubular lamp.

Lamp reflector module 76 (shown in FIG. 13) is formed by placing lamp 62 in a shortened reflector 40a of the type illustrated in FIGS. 5, 5a and 5b. The same nesting and coupling relationship between the lamp 62 and reflector 40a as that described in connection with embodiment 74 exists since reflector 40a is identical to reflector 40, except that it has a shorter overall length.

Surprisingly, the light output derived from lamp-reflector modules 70 and 72 is much greater than that derived from modules 74 and 76 even though the reflector opening is smaller and the diameters of photoflash lamps are only slightly smaller than the reflector opening. This is shown graphically in FIG. 14 wherein the spherical and zonal light outputs of various lamp-reflector modules of the present invention are compared with each other and with the zonal light output of the lamp-reflector module used in a conventional flashcube. As indicated by curve 77, the zonal light output (in the crucial period from 0 to 25 milliseconds) of lamp-reflector module 76 shown in FIG. 13 (short reflector with wide opening) increased from around 300 lumen-seconds to approximately 460 lumen-seconds (or slightly below 475 lumen-seconds) as the spherical light output of the lamp 62 was increased from about 4,400 lumen-seconds to slightly over 6,000 lumen-seconds. This increase is spherical light output was obtained by increasing either the amount of shredded hafnium fuel or the pressure of the oxygen fill. Preferably, both of these parameters were increased by factors which maintained the oxygen stoichiometry at around 90 percent.

Thus, by properly correlating the design parameters of the miniaturized hafnium-fueled photoflash lamp 62, a lamp-reflector module utilizing reflector 40a could be provided which would just about match the zonal light output of 475 lumen-seconds (denoted by the horizontal broken-line 80 in FIG. 14) produced in 0 to 25 milliseconds by the much larger lamp-reflector module 69 and zirconium fuel used in a conventional flashcube.

The aforesaid 475 lumen-second value for the zonal light output represents the light output that is suitable for taking flash pictures and thus constitutes a standard or reference value.

Figure 14:
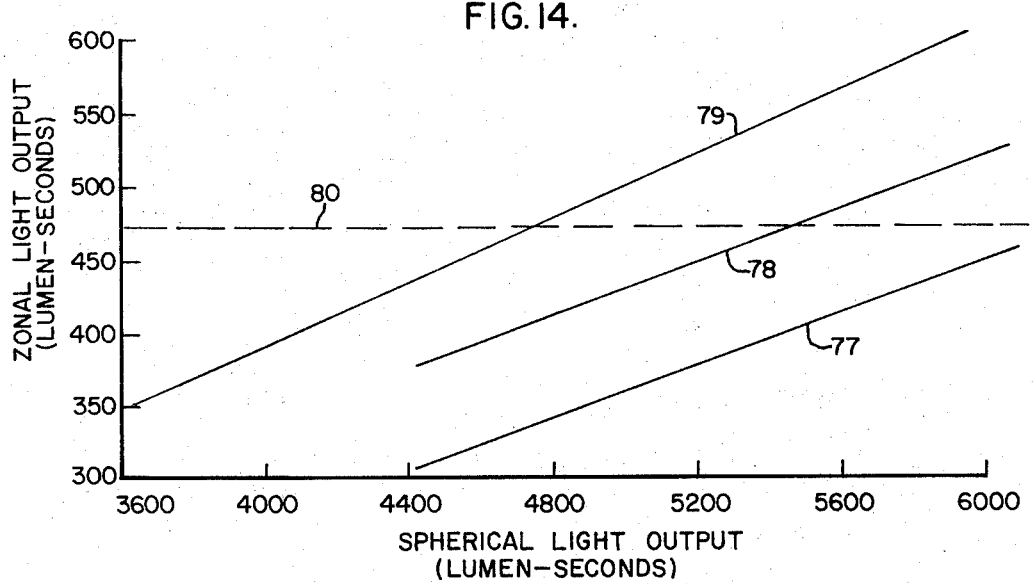
FIG. 14 is a graph illustrating the correlation between the spherical and zonal light outputs of various lamp-reflector combinations embodying the invention.

Curve 78 in FIG. 14 represents the increase in zonal light output achieved with lamp-reflector module 72 shown in FIG. 11 which employs a shortened lamp 62 and a shortened but narrower reflector 30a. As will be noted, when the lamp in this module had a spherical light output of 4,400 lumen-seconds the zonal light output of the lamp-reflector combination was approximately 375 lumen-seconds. When the spherical light output of the lamp was increased to 6,000 lumen-seconds, the zonal light output increased to approximately 550 lumen-seconds. Hence, in this embodiment the desired zonal light output of 475 lumen-seconds can readily be obtained by adjusting the design parameters of the lamp so that its spherical light output is about 5,450 lumen-seconds.

The test data thus shows that an increase of about 25 percent in zonal light output is achieved simply by using the short reflector with a narrow opening (reflector 30a ) instead of a reflector of the same length but with a slightly wider opening (reflector 40a). This increase is graphically depicted by the marked displacement upwardly of curve 78 from curve 77 in FIG. 14.

Figure 10:
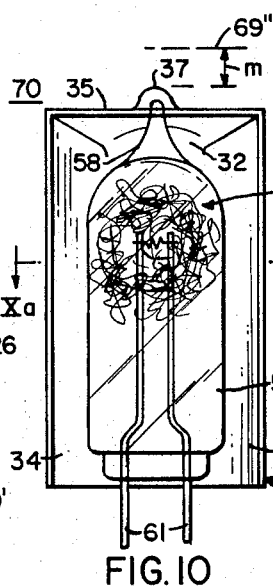
FIG. 10 is a similar view of a miniaturized lamp-reflector embodiment according to the invention.
Figure 10A:
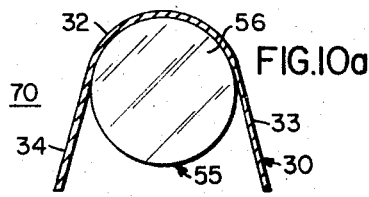
FIG. 10a is a cross-sectional view through the lamp-reflector module of FIG. 10 along line Xa—Xa.

A further increase in zonal light output is achieved when the slightly longer lamp 55 (shown in FIG. 7) is combined with reflector 30 (shown in FIG. 2) which has a correspondingly longer length and a narrow opening to form the lamp-reflector module 70 shown in FIGS. 10 and 10a. The zonal light output of this particular lamp-reflector module is depicted by curve 79 in FIG. 14 and shows that a zonal light output of almost 440 lumen-seconds is obtained when the lamp has a spherical light output of approximately 4,400 lumen-seconds and that the zonal light output increases to about 650 lumen-seconds when the spherical light output of the lamp is increased to about 6,000 lumen-seconds. As will be noted, the desired zonal light output of 475 lumen-seconds is achieved with this particular module by using a lamp that has a spherical light output of approximately 4,700 lumen-seconds. This type lamp-reflector module is accordingly preferred since it permits the desired zonal light output to be achieved with a lamp that has the lowest spherical light output and, thus, the lowest oxygen fill pressure.

As specific examples of the correlation between the amount of hafnium fuel and oxygen fill use in the photoflash lamps from which the data shown in FIG. 14 was obtained, a shortened lamp 62 of the type shown in FIG. 8 had a spherical light output of about 4,400 lumen-seconds when filled with about 31 milligrams of shredded hafnium foil and approximately 8.5 atmospheres of oxygen (90 percent oxygen stoichiometry) and has a spherical light output of approximately 6,000 lumen-seconds when filled with about 42.5 milligrams of shredded hafnium and approximatley 11.6 atmospheres of oxygen.

The slightly larger lamp 55 of the type shown in FIG. 7 had a spherical light output of 4,400 lumen-seconds when filled with about 28 milligrams of shredded hafnium and approximately 6.3 atmospheres of oxygen and had a spherical light output of approximately 6,000 lumen-seconds when filled with about 38 milligrams of shredded hafnium and approximately 8.5 atmospheres of oxygen.

The shred size of the hafnium fuel in each case was nominally 0.0009 inch (0.02286 mm.) thick and 0.0011 inch (0.02794 mm.) wide and thus had a cross-sectional area of just about $1 \times 10^{-6}$ square inch ($6.4 \times 10^{-4}$ sq. mm.).

In contrast, an AG ½ type photoflash lamp 48 shown in FIG. 6 and used in conventional flashcubes generally contain 20 milligrams of shredded zirconium foil and are filled with approximately 7 atmospheres of oxygen.

Figure 15A:
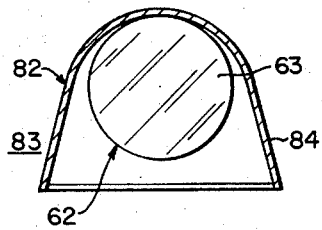
FIGS. 15a and 15b are sectional views through the lamp-reflector embodiment shown in FIG. 15, taken along lines XVa—XVa and XVb—XVb, respectively.
Figure 15:
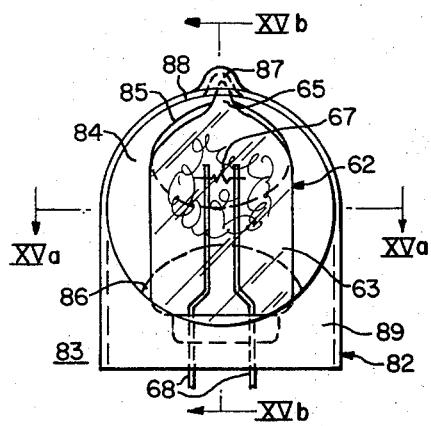
FIG. 15 is a front elevational view of another lamp-reflector embodiment wherein the reflector is of spherical configuration.
Figure 15B:
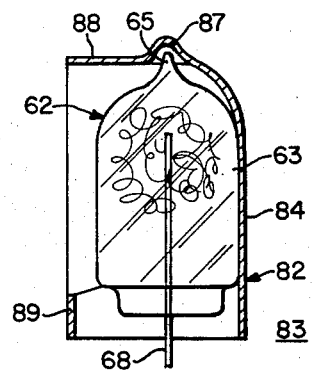

The invention is not limited to rectangular-shaped mini-reflectors of the type previously described but can be used with equal advantage with spherical-shaped minireflectors. A reflector 82 of this type is shown in FIGS. 15, 15a and 15b in combination with a shortened lamp 62 (of the type shown in FIG. 8) to provide an alternative short lamp-reflector module 83. As will be noted, the reflector 82 has a spherical reflector surface 84 which comprises the sides and back of the reflector element and it is provided with two arcuate recesses 85 and 86 (FIG. 15) which accommodate the lamp envelope 63 and permit it to be nestingly seated in contact with the back of the reflector and have its tip 65 positioned within a nipple 87 that protrudes from the arcuate top wall 88 of the reflector.

As will be noted in FIG. 15a, the radius of curvature of the lamp envelope 63 is slightly smaller than the radius of curvature of the surrounding spherical portion 84 of the reflector 82 so that the degree of coupling between the lamp and reflector is about the same as that shown in FIG. 12a and previously described in connection with lamp-reflector module 74. The diameter of the circular opening defined by the top wall 88, front wall 89 and sides of the reflector 82 is just about the same size as the opening of reflectors 40 and 40a.

The reflectors described above can be fabricated by molding a thin sheet of plastic to the desired shape and vapor-depositing a thin film of aluminum or similar specular metal or their inner surfaces in the well-known manner.

The degree of miniaturization effected by the invention in the case of flashcubes is demonstrated by the comparison (in FIGS. 16–18) of the dimensions of a conventional flashcube and two miniaturized flashcubes embodying the invention.

Figure 16:
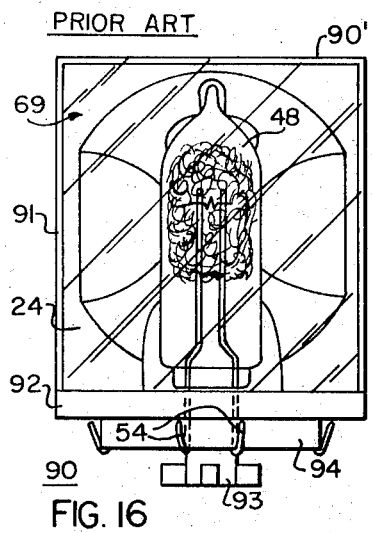
FIG. 16 is a front elevational view of a conventional flashcube.
Figure 17:
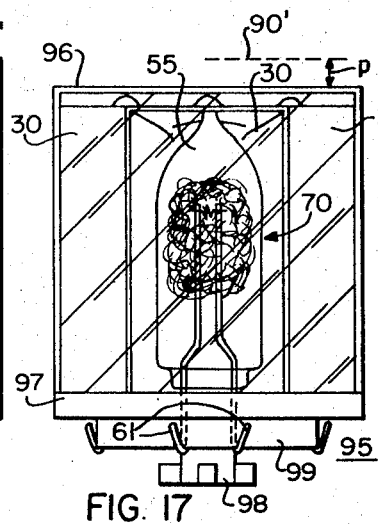
FIGS. 17 and 18 are similar views of two miniaturized flashcubes according to the invention.

The conventional flashcube 90 is shown in FIG. 16 and consists of four lamp-reflector modules 69 (of the type shown in FIG. 9) each of which consists of a reflector 24 and an AG ½ type lamp 48. The modules 69 are arranged back-to-back within a cubical light-transmitting plastic cover 91 that is fastened to a plastic base member 92 which has a protruding post 93 and a ring portion 94 that accommodates the bent-over ends of the lamp lead wires 54 in the well known manner. Conventional flashcubes 90 of the type shown in FIG. 16 have a width of approximately 27 mm. and an overall height of 36 millimeters (measured from bottom of post 93 to the top 90' of the unit).

In contrast, a miniaturized flashcube 95 made with lamp-reflector modules 70 (of the type shown in FIG. 10) consisting of a shortened photoflash lamp 55 and a rectangular-shaped reflector 30 with a narrow opening has the same width dimension but an overall height of approximately 34 mm. —thus reducing the overall height of the flashcube by approximately 2 millimeters (dimension "$p$" in FIG. 17 as measured from the reference line 90') or over 5 percent. Four such lamp-reflector modules 70 are arranged back-to-back in the usual fashion within a light-transmitting cover 96 that is secured to a base member 97 having a central post 98 and a ring segment 99 around which the lead wires 61 of the respective lamps 55 are bent.

Figure 18:
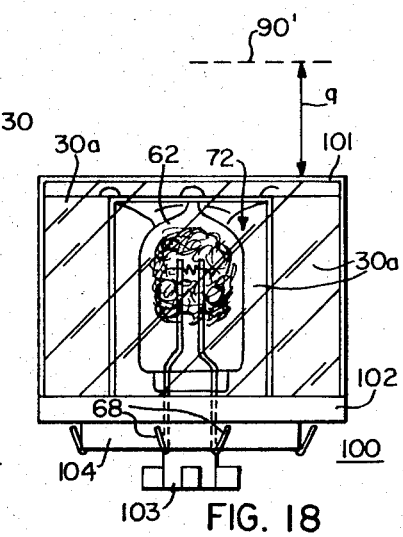

A miniature flashcube 100 of even shorter overall height is shown in FIG. 18. It employs lamp-reflector modules 72 (illustrated in FIG. 11) having the ultra-short reflector 30a and ultra-short photoflash lamp 62. Four such modules 72 are again disposed within a cubical plastic cover 101 that is fastened to a plastic base 102 having a protruding post 103 and the lamp lead wires are bent over a ring portion 104 of the base as before. Compared to the conventional flashcube 90 shown in FIG. 16, the miniflashcube 100 shown in FIG. 18 had the same width dimension but an overall height of 27.6 mm. — thus reducing the height of the flashcube by 8.4 millimeters (dimension "$q$" in FIG. 18 as again measured from reference line 90') or over 23 percent.

Figure 19A:
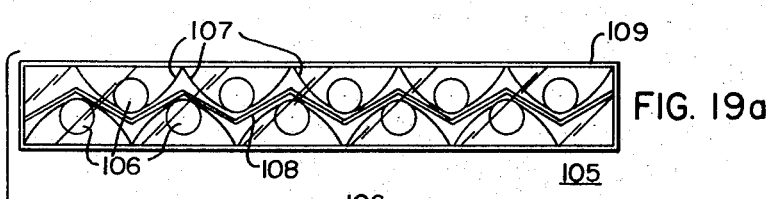
FIGS. 19, 19a and 19b are front elevational, plan and side elevational views, respectively, of a prior art "FlashBar" multiflash unit.
Figure 19:
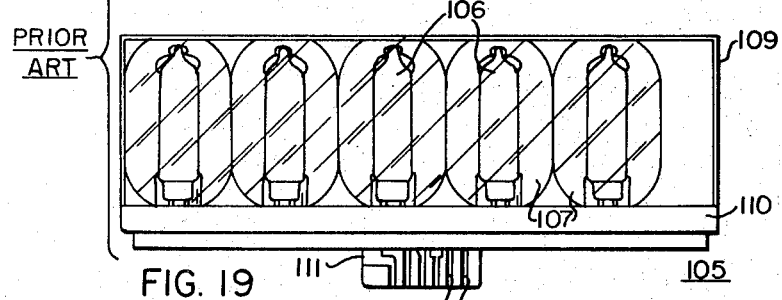
Figure 19B:
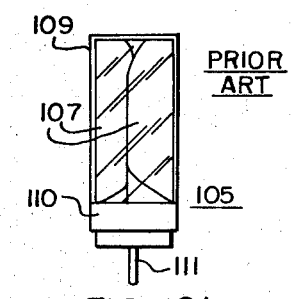

The miniaturized lamp-reflector modules of the present invention can also be employed in other types of multi-flashlamp units to reduce their physical size and make them more compatible with the compact cameras now being marketed. For example, the invention permits a marked reduction in the size of 10-lamp units presently being marked by the General Electric Company and referred to in the "FlashBar" flash array. These units were specially designed for use with the "SX-70 Land" camera recently introduced by the Polaroid Corporation. A "FlashBar" photoflash lamp unit 105 is shown in FIGS. 19, 19a and 19b. As illustrated, it consists of ten elongated tubular flashlamps 106 that are mated with individual reflector elements 107 to form modules that are arranged in staggered back-toback array in two rows of five lamps each. The two rows of lamps are separated by a partition 108 of insulating material (see FIG. 19a). The planar array of lamp-reflector modules is sealed within a light-transmitting plastic cover 109 that is fastened to a plastic base 110, thus forming a rectangular-shaped housing. The base 110 has a protruding tab 111 with printed-circuit contacts 112 on each side that are connected to the individual lamps 106. A detailed description of such "FlashBar" multi-lamp arrays or units is given in U.S. Pat. Nos. 3,598,984 and 3,598,985, and the lamp-reflector module for such units is disclosed in detail in U.S. Pat. No. 3,609,332.

Figure 20A:
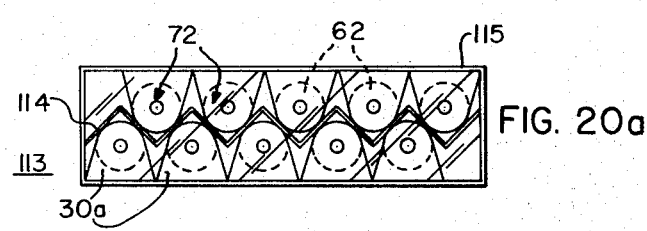
FIGS. 20, 20a and 20b are similar views of a miniaturized ten-lamp unit of the same type according to the invention.
Figure 20:
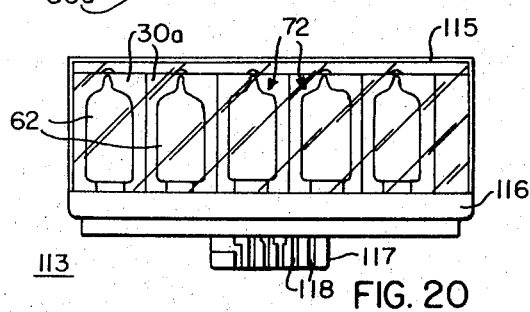
Figure 20B:
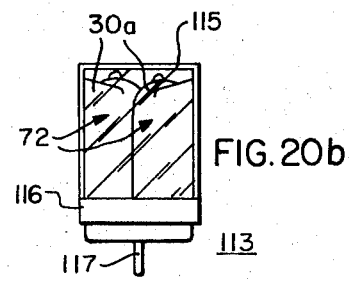

A rectangular ten-lamp flash unit 113 according to this invention that has markedly reduced length and height dimensions but produces a zonal light output sufficient to properly expose photographic film is shown in FIGS. 20, 20a and 20b. As will be noted, the miniaturized bar-like multi-flash unit 113 has the same general structural features as the above-described "FlashBar" unit 105 but employs 10 miniaturized lamp-reflector modules 72 of the type shown in FIG. 11. The reflectors 30a and their lamps 62 are separated by a partition 114 (see FIG. 20a) of insulating material and are arranged in staggered back-to-back relationship to provide two rows that contain five lamp-reflector modules each. The lamps and reflectors are protectively housed within a light-transmitting plastic cover 115 that is fastened to a plastic base 116 having a protruding tab 117 with printed-circuit contacts 118 that are connected to the individual lamps in the same manner as in the "FlashBar" unit 105 described above.

In contrast to the prior art "FlashBar" photoflash array 105 (which has a length dimension of 107 millimeters, an overall height of 43 millimeters and a width dimension of 14 millimeters), the improved 10-lamp flash unit 113 has an overall length of approximately 72 millimeters, an overall height of approximately 37 millimeters and a width dimension of approximately 20 millimeters. Hence, the improved planar multi-flash unit was reduced over 30 percent in length and over 13 percent in overall height (as is apparent from a visual comparison of FIGS. 19 and 19a with FIGS. 20 and 20a which show the respective drawn to the same scale), even though the improved unit 113 had a greater width dimension.

The miniaturized reflector-lamp modules of the present invention can also be used in other types of multi-flash units. For example, twelve lamp-reflector modules 72 of the kind shown in FIG. 11 can be arranged in side-by-side circular array to form a flat cylindrical multi-flash pack or assembly 119 shown in FIGS. 21, 21a and 21b. The individual reflector components 30a and photoflash lamps 62 are held in this geometrical formation by a snug fitting cylindrical-shaped cover 120 of light-transmitting plastic that is fastened to a plastic base member 121 which has a central post 122 (adapted to engage a socket) and a ring portion 123 which holds the bent-over ends of the lamp lead wires 68 in uniformly spaced relationship. As will be noted in FIGS. 21 and 21a, the lamp-reflector modules 72 are snugly interfitted with one another to form a very compact cylindrical multi-flash unit 119.

Figure 21A:
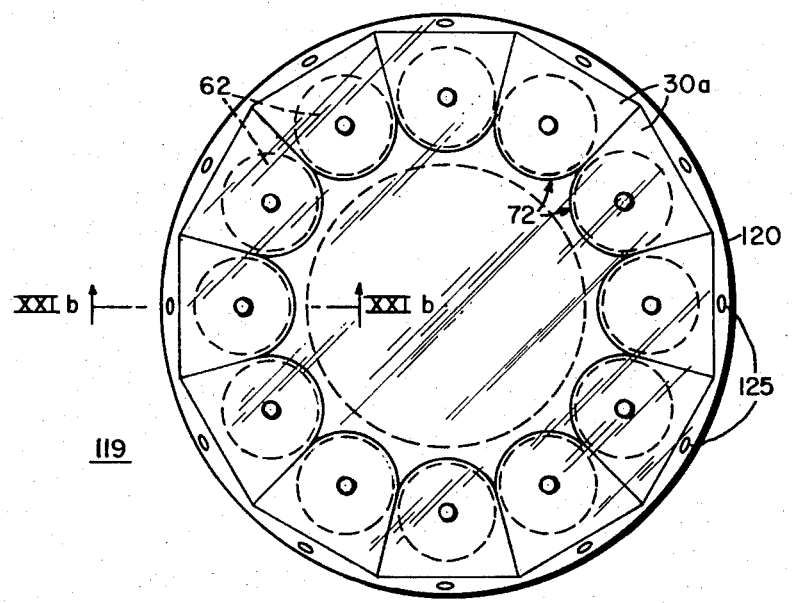
FIGS. 21 and 21a are elevational and plan views, respectively, of a miniaturized 12-lamp flash unit of cylindrical configuration.
Figure 21:
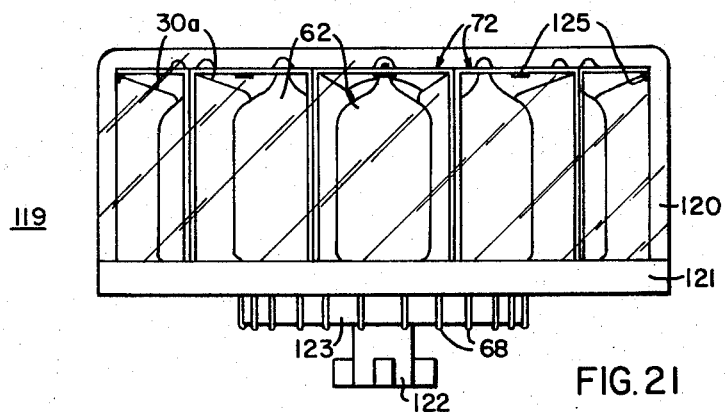
Figure 21B:
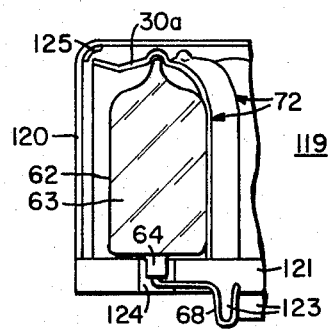
Figure 21C:
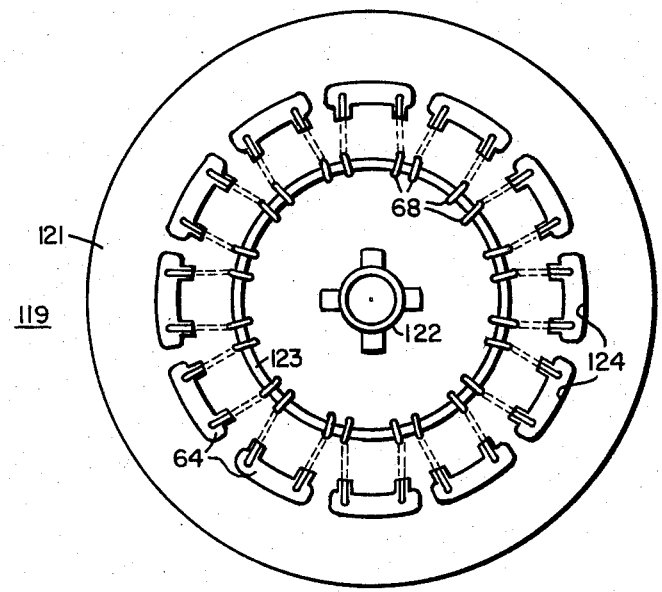

As illustrated in FIGS. 21b and 21c, the overall height of the cylindrical multi-flash unit 119 is reduced to an even further degree by providing a series of slot openings 124 in the base 121, which openings are dimensioned and spaced to accommodate the press seals 64 of the respective lamp envelopes 63 and enable the shoulder portions of the envelopes to seat against the inner surface of the base 121. The photoflash lamps 62 are thus partly recessed within the base member 121 and the overall height dimension of the multi-flash unit 119 is reduced by a corresponding amount. When lamp-reflector modules 72 are employed as shown in the drawing, the resulting multi-flash unit 119 had a diameter of about 55 millimeters and an overall height of approximately 30 millimeters.

In order to provide a visual indication of which lamps 62 have been fired and which have not, a spot 125 of suitable thermally responsive marker material is desirably deposited on the inner surface of the plastic cover 120 in front of each lamp 62 and at the top of the cover (as shown in FIGS. 21, 21a and 21b) so that it can be seen when the unit 119 is mounted on a camera. Such marker materials are well known in the art. A suitable one consisting of a blue-colored mixture of powdered glass and a water insoluble dye that changes the color of the mixture to bright red in response to the heat generated by the fired lamps is described in U.S. Pat. No. 3,718,815 issued to McDonough et al. on Feb. 27, 1973.

Figure 22:
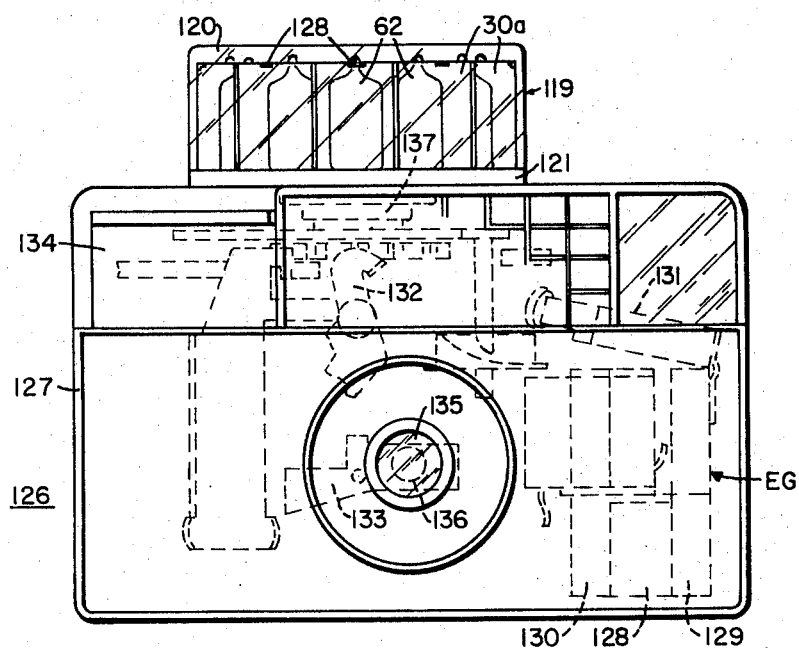
FIG. 22 is an elevational view of an "Instamatic" type camera that is fitted with the miniaturized twelve-lamp flash unit shown in the preceding figures.

As shown in FIG. 22, the 12-lamp flash unit 119 can be employed with an "Instamatic type camera 126 having a housing 127 that contains a mechanically powered-and-triggered electric generator EG consisting of a permanent magnet 128, a pair of pole pieces 129 and 130 and a spring-loaded keeper 131 that is movable toward and away from bridging contact with the ends of the pole pieces. The keeper 131 is held in raised position when cocked and is released in synchronized sequence with an actuating mechanism 132 that trips the shutter 133 when the push-button 134 on the top of the camera 126 is depressed to snap the picture. The lens 135 and aperture 136 are thus opened by the shutter 133 just as one of the multi-lamp flashlamps 62 in the multi-lamp unit 119 is being fired by the voltage pulse produced by the tripped generator EG. The unit 119 is, of course, inserted into a suitable socket 137 on the camera 126 which rotates and indexes a fresh lamp 62 into firing position when the film-indexing mechanism is actuated and moves the socket 137 and flash unit 119. A camera having a gear arrangement which couples the film-indexing mechanism with the socket 137 in a manner that automatically rotates the socket in 30° steps is disclosed in the aforementioned concurrently filed application Ser. No. 380,180.

While the use of hafnium fuel in the photoflash lamps employed in the modules and multflash units of the present invention provide intense light flashes having a color temperature of at least 4,600° K pursuant to the teachings of U.S. Pat. No. 3,675,004 of Gulbransen et al., the color-temperature can be adjusted to make it more compatible with the spectral response of daylight-type color film. This can be achieved by adding suitable tinting dyes to the plastic lacquer used to coat the individual lamps or to the plastic from which the covers for the various units are made. Such color-correcting dyes and the manner of incorporating them in plastic coatings, etc. are well known to those in the art.

We claim as our invention:
1. A photoflash device comprising the combination of;

a photoflash lamp that has a tubular envelope which contains hafnium fuel and an oxygen fill and is of such diameter and length that the envelope volume is less than 0.6 cc., and a reflector having an arcuate rear wall portion, that is in nested relationship with the lamp envelope and has substantially flat outwardly-diverging side wall segments that define an opening in the front of the reflector the maximum width dimension whereof is from about 1.2 to 2 times as large as the diameter of the lamp envelope, the amounts of hafnium fuel and oxygen within said envelope being so correlated that the device produces a zonal light output of at least 460 lumen-seconds when the lamp is flashed.

2. The photoflash device of claim 1 wherein; said reflector is of spherical configuration, and the front opening of said reflector is circular.

3. The photoflash device of claim 1 wherein; said oxygen has a fill pressure of at least six atmospheres, and said hafnium fuel is in the form of metal shreds.

4. The photoflash device of claim 3 wherein the contained amounts of hafnium fuel and oxygen are such that the oxygen stoichiometry is approximately 90 percent.

5. The photoflash device of claim 1 wherein; the arcuate rear wall portion of the reflector is of circular cross-sectional configuration, and said reflector includes a top wall that encloses the top of the lamp envelope.

6. The photoflash device of claim 5 wherein; said lamp envelope is terminated at one end by a protruding tip, and the top wall of said reflector has a recess therein that accommodates the envelope tip.

7. The photoflash device of claim 5 wherein; said envelope has a volume between about 0.4 and 0.6 cubic centimeter, and the top and side wall segments of the reflector are so disposed that the front opening of said reflector is substantially rectangular.

8. The photoflash device of claim 7 wherein the diameter of said lamp envelope is approximately 9 mm.

9. The photoflash device of claim 7 wherein the envelope and the circular rear wall portion of the reflector have substantially the same radius of curvature.

10. The photoflash device of claim 7 wherein the radius of curvature of the circular rear wall portion of the reflector is greater than that of said envelope.

11. The photoflash device of claim 7 wherein; said envelope has a diameter of approximately 9 mm. and a length of about 16 mm., and said reflector has an overall height of approximately 17 mm.

12. The photoflash device of claim 7 wherein; said envelope has a diameter of approximately 9 mm. and a length of about 22.5 mm., and said reflector has an overall height of approximately 23.5 mm.

13. A miniature multiflash unit for a photographic camera comprising;

a plurality of photoflash lamp-reflector modules disposed in predetermined array with the lamp envelopes disposed within the respective reflectors, said modules being of the same shape and size and having an overall height less than about 25 mm. and a width less than about 15 mm., said reflectors having an arcuate rear wall portion and substantially flat outwardly diverging side wall portions that define a front opening the maximum width dimension whereof is from about 1.2 to 2 times as large as the maximum width dimension of the associated lamp envelope, and said photoflash lamps being disposed in nested relationship with the arcuate rear wall portions of the associated reflectors and containing hafnium fuel and an oxygen fill in amounts that are so correlated that the lamps each produce a zonal light output of at least 460 lumen-seconds when flashed, a base member holding said lamp-reflector modules in arrayed position, a cover of light-transmitting material enclosing said arrayed lamp-reflector modules and fastened to said base member, and contact means on said base member electrically connected to selected lamps of the respective modules.

14. The miniature multiflash unit of claim 13 wherein;

said cover is of generally cubical configuration and encloses four lamp-reflector modules arranged in back-to-back relationship, and said base member is of rectangular configuration and has a depending post and said unit thus comprises a miniature flashcube.

15. The miniature flashcube of claim 14 wherein; each of said photoflash lamps have a tubular envelope that has a predetermined diameter, the hafnium fuel in said lamps comprises metal shreds, and the overall height of said miniature flashcube is less than 36 mm.

16. The miniature multiflash unit of claim 13 wherein;

said lamp-reflector modules are disposed in planar array in two rows with the modules in one row positioned in staggered back-to-back relationship with the modules of the other row, and said multiflash unit is of generally rectangular shape and has a length less than 105 mm. and an overall height less than 43 mm.

17. The miniature rectangular-shaped multiflash unit of claim 16 wherein;

each of said lamps have a diameter of about 9 mm. and a volume between about 0.4 and 0.6 cc., and said unit has an overall height of approximately 37 mm. and a length of approximately 72 mm.

18. The miniature multiflash unit of claim 13 wherein said lamp-reflector modules are disposed in side-by-side circular array and said unit is thus of flat cylindrical configuration.

19. The miniature cylindrical-shaped multiflash unit of claim 18 wherein;

said unit contains twelve lamp-reflector modules, each of the lamps are closed at one end by a press seal, and said base member has a series of spaced openings therein that accommodate only the press seal portions of the respective lamps and said lamps are thus each partly recessed in said base member.

20. The miniature cylindrical-shaped 12-lamp flash unit of claim 19 wherein a quantity of heat-sensitive colored material is disposed on said cover in heat-receptive proximity with each of the respective lamps and thus serves as a means for visually indicating the condition of the lamps.

* * * * *